W. W. STEVENS.
COFFEE-POT.
No. 186,378. Patented Jan. 16, 1877.
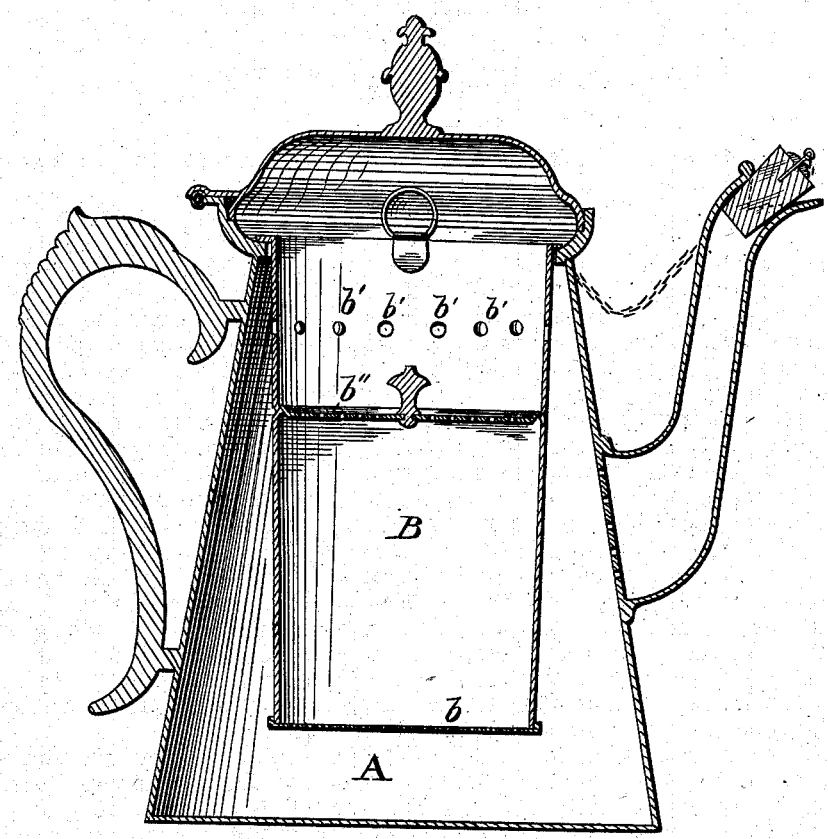
Witnesses.
Franck L. Ourand.
Pennington Halsted
Inventor.
William W. Stevens
per L. Deane.
Attorney

UNITED STATES PATENT OFFICE.

WILLIAM W. STEVENS, OF PORTLAND, MAINE, ASSIGNOR TO WESTBROOK BRITANNIA COMPANY, OF SAME PLACE.

IMPROVEMENT IN COFFEE-POTS.

Specification forming part of Letters Patent No. 186,378, dated January 16, 1877; application filed December 19, 1876.

*To all whom it may concern:*

Be it known that I, WILLIAM W. STEVENS, of Portland, in the county of Cumberland and State of Maine, have invented certain new and useful Improvements in Coffee-Pots, of which the following is a specification:

Figure 1 is a vertical central section through the body of the coffee-pot, showing the coffee-receptacle or internal detachable cylinder in position as when in use.

The design of present invention is to provide for a coffee-pot an interior compartment, adapted to contain the coffee-grounds and afford a chamber into and through which the water, in its ebullitions in the body of the pot, shall continually pass; and it consists, more particularly, in a cylinder sloping gradually from top to bottom, having numerous apertures through the upper part, an open mouth, a perforated bottom, an internal perforated diaphragm, and fitting at its upper end air-tight into the top of the pot, all in the manner and for the purposes now to be more fully set out and explained.

In the drawings, A denotes the coffee-pot, having spout, handle, and cover, as usual, and provided with the internal and detachable cylinder or coffee-receptacle B. This receptacle has wire-gauze or perforated metal $b$ permanently attached to its lower end, and slots or apertures at its upper end, at $b'$. About midway of the height of the coffee-receptacle is adapted, upon supporting-ledges or otherwise, the perforated diaphragm $b''$. The diameter of the internal cylinder at its upper end is such, relatively to that of the inside of the pot, at its top, that when the said cylinder or receptacle is adapted to the pot in position for use, and as now indicated in the drawing, it will so closely fit with the pot as to make at this point an air-tight joint. This is of especial use and importance in carrying out the design of my said invention.

As thus made, the operation of my device will be as follows: The cylinder or receptacle being in position, through the lid of the pot the coffee-grounds are placed upon the reticulated lower end of the receptacle, and the perforated diaphragm is then put over them. A suitable quantity of water may, before or after putting the coffee in, be poured into the pot. The lid being now shut down, and the pot placed upon the stove, the ebullitions of the water in boiling will cause it to circulate or flow from the chamber surrounding the coffee-receptacle or cylinder, through the apertures $b'$ into the cylinder, and down through the diaphragm, and upon the coffee-grounds at the lower end of the cylinder. In this way the strength of the coffee, or the caffeine, will be very soon extracted, and in the most thorough manner.

While the coffee-receptacle is adapted to fit so closely into the pot, it can be easily removed, as for cleaning it or the pot, by using the rings in its upper end, or any convenient handle for that purpose.

Having thus described my invention, what I consider new, and desire to secure by Letters Patent, is—

In combination with the coffee-pot A, the inner detachable coffee-receptacle B, tapering from the top downward, and having a fixed perforated bottom, $b$, detachable diaphragm $b''$, and apertures, at $b'$, in its upper end, and adapted to fit air-tight, at or near its top, into the said pot, substantially in the manner and for the purposes herein set forth.

In testimony that I claim the foregoing as my own I affix my signature in presence of two witnesses.

WILLIAM W. STEVENS.

Witnesses:
GEO. W. DEERING,
CHARLES B. MERRILL.